US011913625B2

(12) United States Patent
Wang

(10) Patent No.: US 11,913,625 B2
(45) Date of Patent: Feb. 27, 2024

(54) LED LAMP BULB WITH CRIMP TYPE FIXED WIRES

(71) Applicant: DONGGUAN HUIHUAN LIGHTING CO., LTD, Dongguan (CN)

(72) Inventor: Song Wang, Chengdu (CN)

(73) Assignee: DONGGUAN HUIHUAN LIGHTING CO., LTD, Dongguan (CN)

( * ) Notice: Subject to any disclaimer, the term of this patent is extended or adjusted under 35 U.S.C. 154(b) by 0 days.

(21) Appl. No.: 18/089,778

(22) Filed: Dec. 28, 2022

(65) Prior Publication Data

US 2023/0135391 A1 May 4, 2023

(30) Foreign Application Priority Data

Nov. 4, 2022 (CN) ......................... 202222938339.9

(51) Int. Cl.

| | |
|---|---|
| ***F21V 19/00*** | (2006.01) |
| ***F21K 9/232*** | (2016.01) |
| ***F21K 9/235*** | (2016.01) |
| ***F21V 23/00*** | (2015.01) |
| ***F21Y 115/10*** | (2016.01) |
| ***F21Y 103/10*** | (2016.01) |

(52) U.S. Cl.

CPC .......... *F21V 19/0025* (2013.01); *F21K 9/232* (2016.08); *F21K 9/235* (2016.08); *F21V 23/002* (2013.01); *F21Y 2103/10* (2016.08); *F21Y 2115/10* (2016.08)

(58) Field of Classification Search

CPC ......... F21K 9/235; F21V 19/0025; F21S 4/10

See application file for complete search history.

(56) References Cited

U.S. PATENT DOCUMENTS

| | | | | |
|---|---|---|---|---|
| 7,422,489 | B1 * | 9/2008 | Tseng | F21V 21/002 439/699.2 |
| 10,415,764 | B1 * | 9/2019 | Lei | F21K 9/232 |
| 10,718,470 | B1 * | 7/2020 | Wu | F21V 31/005 |
| 10,718,471 | B1 * | 7/2020 | Wu | F21K 9/238 |
| 2012/0153823 | A1 | 6/2012 | Lee | |
| 2017/0254483 | A1 * | 9/2017 | Klafta | F21K 9/238 |
| 2018/0119892 | A1 | 5/2018 | Jiang et al. | |
| 2019/0170304 | A1 | 6/2019 | Jiang | |
| 2023/0258303 | A1 * | 8/2023 | Huang | F21K 9/232 315/185 R |

* cited by examiner

*Primary Examiner* — William N Harris

(74) *Attorney, Agent, or Firm* — Zhigang Ma

(57) ABSTRACT

The present disclosure relates to the technical field of lamps, and discloses a light-emitting diode (LED) lamp bulb with crimp-type fixed wires, including a lamp base and a shell connected to the lamp base, and further including a stem assembly. The stem assembly includes a plastic seat, and a first metal supporting wire, an LED bar and a second metal supporting wire which are electrically connected with each other in sequence. The plastic seat is connected to an opening portion of the shell. One end of the plastic seat is provided with a cavity having an opening, and the other end is provided with a raised tongue portion. The raised tongue portion is at least provided with a first wire guide hole and a second wire guide hole.

7 Claims, 6 Drawing Sheets

LED LAMP BULB WITH CRIMP TYPE FIXED WIRES

TECHNICAL FIELD

The present disclosure relates to the technical field of lamps, in particular, to a light-emitting diode (LED) lamp bulb with crimp-type fixed wires.

BACKGROUND

Lamp bulbs are main lamps used for lighting. With the development of technologies, there are a variety of lamp bulbs, including traditional tungsten lamp bulbs, LED chip lamp bulbs, LED bar lamp bulbs and the like. At the same time, people are no longer limited to using lamp bulbs for ordinary lighting, but also more inclined to use lamp bulbs to create different atmospheres. For example, people use lamp bulbs in family gatherings, parties and other outdoor entertainment venues to heighten the atmosphere of parties, spice up the parties, enhance the artistic effect, etc.

The inventor's previous Chinese patent CN202022927735.2 discloses a stem structure of a lamp bulb, and a lamp bulb. The stem structure includes a plastic seat and at least one resistor a. A first metal supporting wire passes through a first clamping seat in turn to a first guide hole, and the resistor a is clamped and fixed in the first clamping seat. The first metal supporting wire extends outward to be electrically connected to a light bar. After several years of extensive use of the prior art, it is found that fixing a metal supporting wire has a good technical effect in most cases. However, because of the existence of the clamping seat, the cost is high, and the assembling process also has high requirements. In view of this, the inventor has made further improvements.

SUMMARY

For the shortcomings in the prior art, the present disclosure aims to provide an LED lamp bulb with crimp-type fixed wires, which features with small volume, convenience of use and low cost.

In order to achieve the above objective, the present disclosure is an LED lamp bulb with crimp-type fixed wires, including a lamp base and a shell connected to the lamp base, and further including a stem assembly; the stem assembly includes a plastic seat, and a first metal supporting wire, an LED bar and a second metal supporting wire which are electrically connected with each other in sequence; the plastic seat is connected to an opening portion of the shell; one end of the plastic seat is provided with a cavity having an opening, and the other end is provided with a raised tongue portion; the raised tongue portion is at least provided with a first wire guide hole and a second wire guide hole; the first wire guide hole and the second wire guide hole are both communicated with the cavity; one end of the first metal supporting wire is electrically connected to the LED bar through the first wire guide hole; one end of the second metal supporting wire is electrically connected to the LED bar through the second wire guide hole; the other ends of the first metal supporting wire and the second metal supporting wire are both electrically connected to the lamp base; and the first metal supporting wire is fixed by means of being crimped with an outer side of the first wire guide hole, and/or the second metal supporting wire is fixed by means of being crimped with an outer side of the second wire guide hole.

Further, the raised tongue portion is provided with a first side surface and a second side surface; and the first side surface and the second side surface are both provided with fixing regions.

Further, the first metal supporting wire is fixed by means of being crimped with the fixing region of the first side surface and/or the second side surface.

Further, the first metal supporting wire is fixed by means of being crimped with an upper end position, a middle position or a lower end position of the fixing region of the first side surface.

Much further, the first metal supporting wire is fixed by means of being crimped with at least one site of the fixing region of the first side surface.

Preferably, each of the first metal supporting wire and the second metal supporting wire includes an antiskid section.

Preferably, a bottom end of the plastic seat is provided with a first wire slot and a second wire slot; the first wire slot is used for placing the first metal supporting wire; and the second wire slot is used for placing the second metal supporting wire.

Preferably, four to eight protrusions are also arranged on an outer side of the plastic seat.

Preferably, a bottom end of the plastic seat is provided with a flange cooperating with the opening portion of the shell.

Further, the plastic seat is made of a polypropylene (PP) or polyethylene (PE) material.

Beneficial effects: Compared with the prior art, the present disclosure provides an LED lamp bulb with crimp-type fixed wires, including a lamp base and a shell connected to the lamp base, and further including a stem assembly. The stem assembly includes a plastic seat, and a first metal supporting wire, an LED bar and a second metal supporting wire which are electrically connected with each other in sequence. The plastic seat is connected to an opening portion of the shell. One end of the plastic seat is provided with a cavity having an opening, and the other end is provided with a raised tongue portion. The raised tongue portion is at least provided with a first wire guide hole and a second wire guide hole. The present disclosure has the following advantages: 1. The first metal supporting wire and the second metal supporting wire are fixed by means of being directly crimped with partial outer sides of the wire guide holes of the raised tongue portion, and no other components are required, so that the overall lamp is easier and more convenient to assemble, and the production efficiency of the lamp is effectively improved. 2. The entire production process of lamps is simplified, and the production cost is effectively reduced. 3. The overall lamp is simple in structure and convenient to use.

Figure 1:
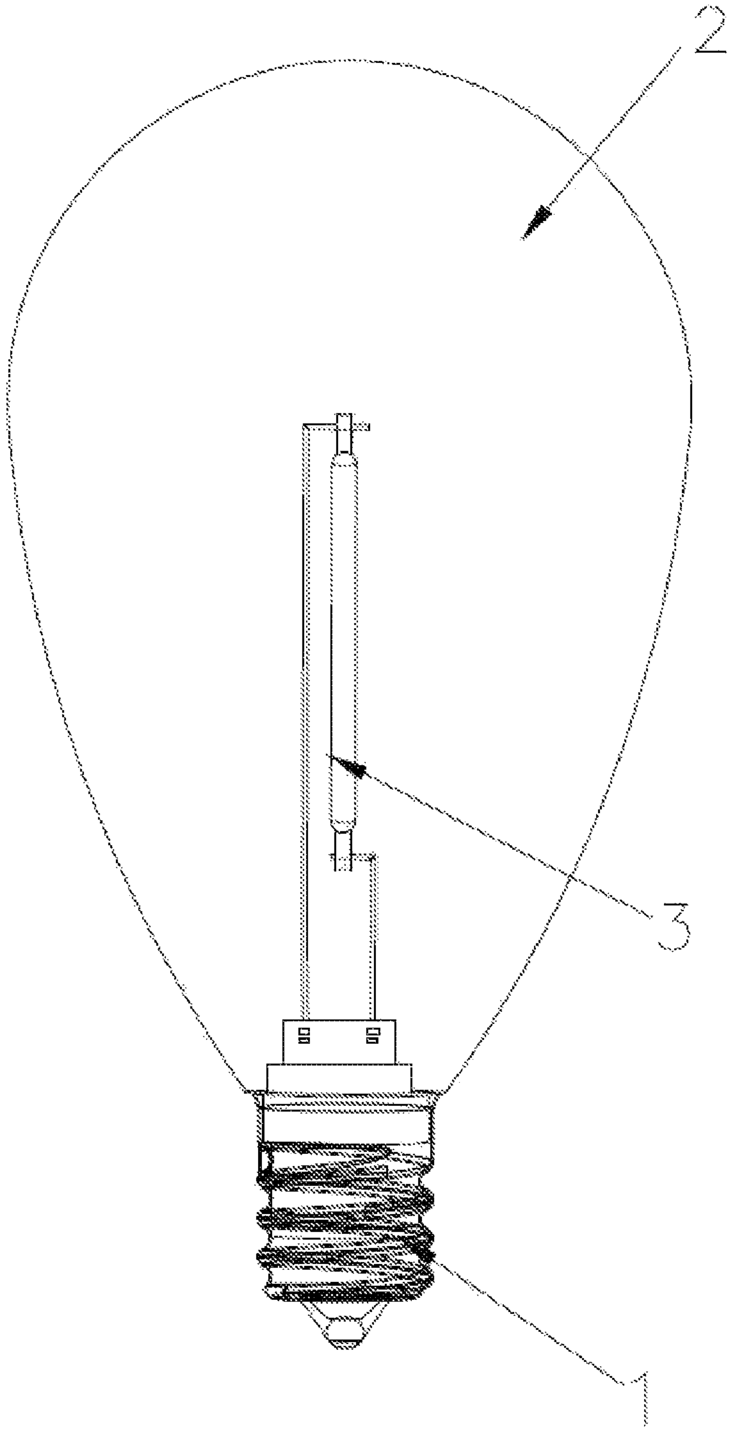
FIG. 1 is a schematic three-dimensional diagram of the present disclosure.
Figure 2:
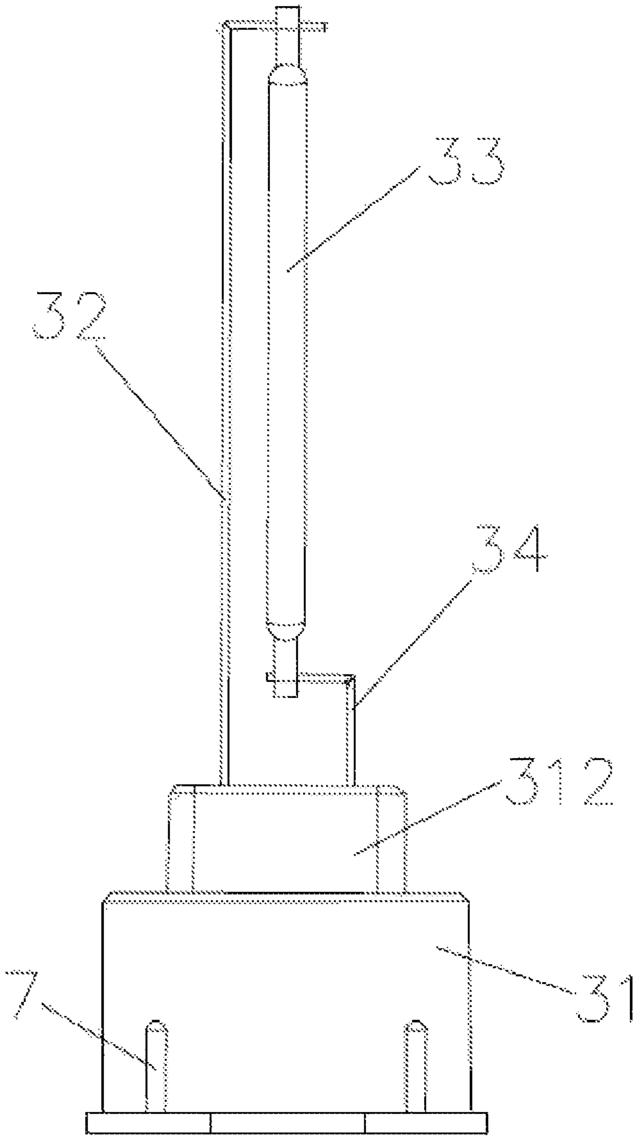
FIG. 2 is a schematic structural diagram of a stem assembly of the present disclosure.

Reference numerals include:

1: lamp base; 2: shell; 3: stem assembly; 31: plastic seat; 311: cavity; 312: raised tongue portion; 313: first wire guide hole; 314: second wire guide hole; 315: first side surface; 316: second side surface; 317: fixing region; 318: site; 32: first metal supporting wire; 33: LED bar; 34: second metal supporting wire; 4: antiskid section; 5: first wire slot; 6: second wire slot; 7: protrusion; 8: flange; and 9: resistor.

DETAILED DESCRIPTION OF THE EMBODIMENTS

The present disclosure is described in detail below in combination of FIG. 1-FIG. 6.

The present disclosure provides an LED lamp bulb with crimp-type fixed wires, including a lamp base 1 and a shell 2 connected to the lamp base 1, and further including a stem assembly 3. The stem assembly 3 includes a plastic seat 31, and a first metal supporting wire 32, an LED bar 33 and a second metal supporting wire 34 which are electrically connected with each other in sequence. The plastic seat 31 is connected to an opening portion of the shell 2. One end of the plastic seat 31 is provided with a cavity 311 having an opening, and the other end is provided with a raised tongue portion 312. The raised tongue portion 312 is at least provided with a first wire guide hole 313 and a second wire guide hole 314. The first wire guide hole 313 and the second wire guide hole 314 are both communicated with the cavity 311. One end of the first metal supporting wire 32 is electrically connected to the LED bar 33 through the first wire guide hole 313. One end of the second metal supporting wire 34 is electrically connected to the LED bar 33 through the second wire guide hole 314. The other ends of the first metal supporting wire 32 and the second metal supporting wire 34 are both electrically connected to the lamp base 1. The first metal supporting wire 32 is fixed by means of being crimped with an outer side of the first wire guide hole 313, and/or the second metal supporting wire 34 is fixed by means of being crimped with an outer side of the second wire guide hole 314.

Figure 3:
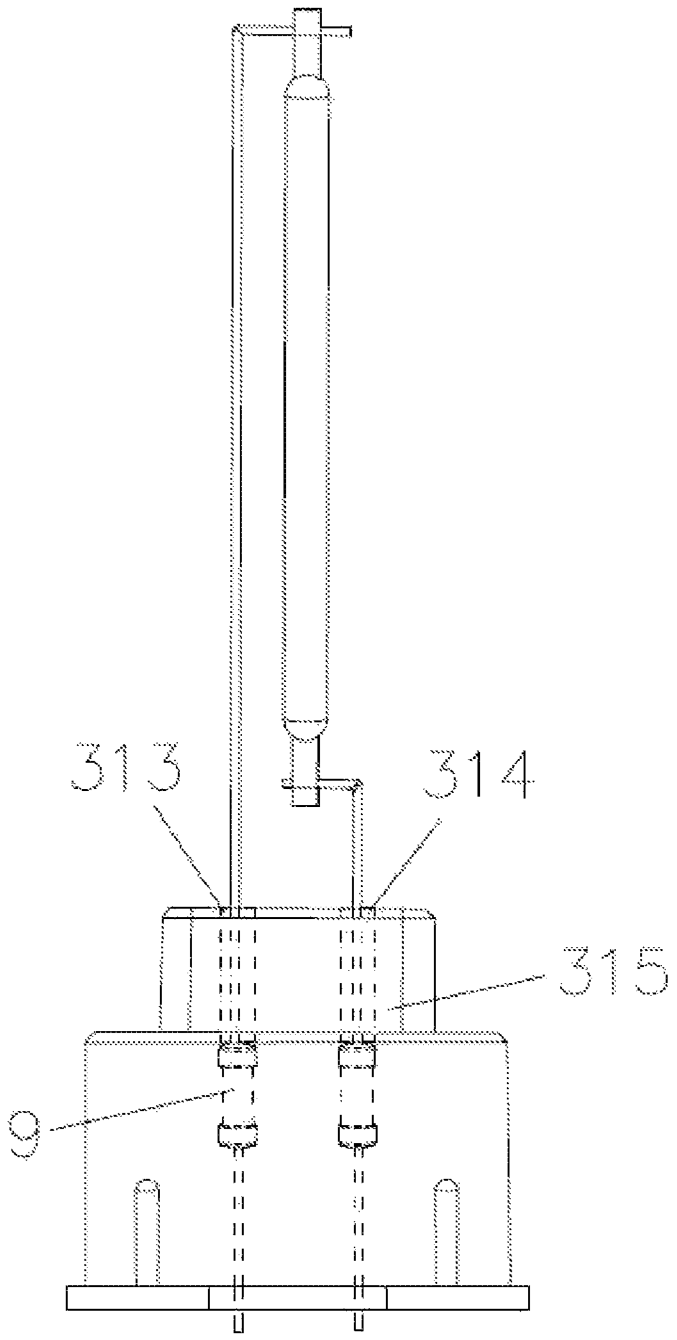
FIG. 3 is a schematic perspective view of a plastic seat of the present disclosure.

In an assembling process of the lamp bulb of the present disclosure, the first metal supporting wire 32 and the second metal supporting wire 34 are crimped with the wire guide holes of the raised tongue portion 312 after passing through the wire guide holes of the plastic seat 31, so that a space between the wire guide holes and the metal supporting wires becomes smaller. The metal supporting wires are stably fixed in the plastic seat 31 until the metal supporting wires are locked by the plastic material that is crimped to deform. The metal supporting wires are fixed without additionally arranging a clamping seat or adding a resistor, so that the overall structure of the lamp bulb is effectively simplified, the production cost of the lamp bulb is reduced, and the lamp bulb is more in line with the production requirements. According to another aspect, after the metal supporting wires are crimped to be fixed, a resistor 9 connected to the metal supporting wires can also be fixed in the plastic seat 31, as shown in FIG. 3. In addition, the resistor 9 of the lamp bulb can also be mounted on the metal supporting wire portions above the plastic seat 31 or integrated in the LED bar 33. There may be one or more resistors 9.

Figure 4:
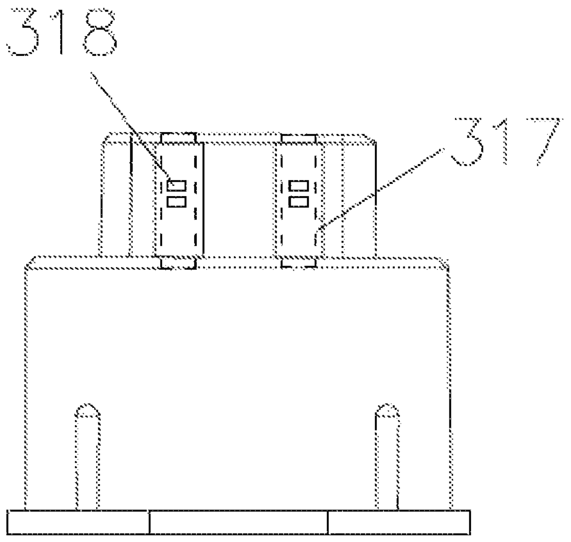
FIG. 4 is a schematic structural diagram of a first side surface of the present disclosure.
Figure 5:
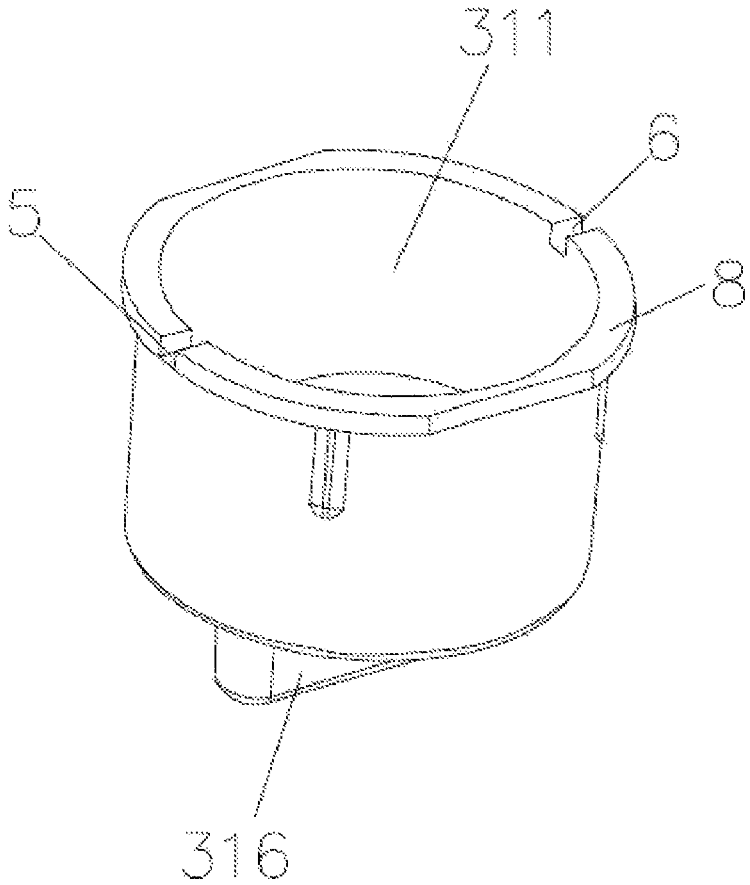
FIG. 5 is a schematic structural diagram of a plastic seat of the present disclosure.
Figure 6:
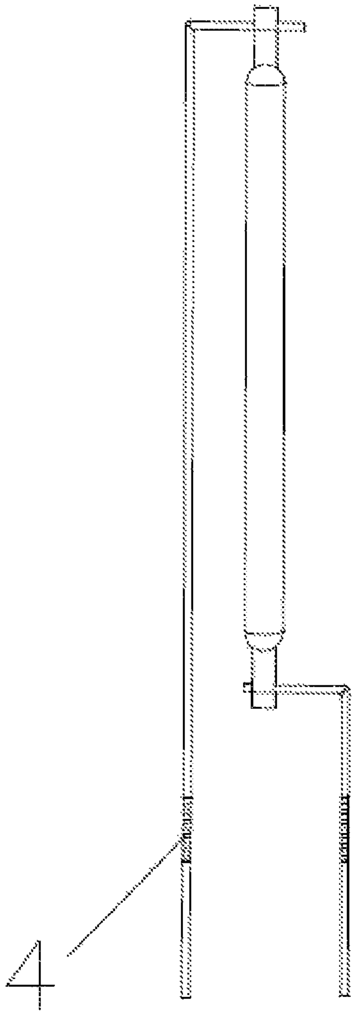
FIG. 6 is a schematic structural diagram of a metal supporting wire of the present disclosure.

In this technical solution, the raised tongue portion 312 is provided with a first side surface 315 and a second side surface 316. The first side surface 315 and the second side surface 316 have dual effects: The first effect is effectively improving the assembling efficiency because, for automatically assembling the lamp bulb, the first side surface 315 and the second side surface 316 are planes, which are conveniently grabbed by a manipulator and directionally transferred to the plastic seat 31. The second effect is conveniently crimping and fixing the metal supporting wires because the first side surface 315 and the second side surface 316 as primary crimping portions are both provided with fixing regions 317. It should be noted here that the fixing regions 317 refer to outer side portions corresponding to the first wire guide hole 313 and the second wire guide hole 314, and are primary primping regions. There are totally four fixing regions, as shown in FIG. 4, symmetrically arranged on the first side surface 315 and the second side surface 316 respectively.

In one embodiment, when the first metal supporting wire 32 is crimped and fixed, automatic equipment can be used to only crimp the fixing regions 317 of the first side surface 315 or the second side surface 316 to narrow the first wire guide hole 313 to clamp the first metal supporting wire 32, or to simultaneously crimp the first side surface 315 and the second side surface 316 to fix the first metal supporting wire 32.

In another embodiment, as mentioned above, after the side surface for crimping is selected, the first metal supporting wire 32 is fixed by means of being crimped with an upper end position, a middle position or a lower end position of the fixing region 317 of the first side surface 315. Crimping the upper, middle and lower end positions of the fixing region 317 can achieve an effect of fixing the first metal supporting wire 32.

In still another embodiment, as mentioned above, after a crimping position is selected, at least one crimping site 318 is selected from the upper, middle and lower positions of the fixing region 317 for crimping. As shown in FIG. 4, the first metal supporting wire 32 is usually fixed by being crimped with two sites 318.

In the present disclosure, the fixing way for the second metal supporting wire 34 is the same as the fixing way for the first metal supporting wire 32.

In this technical solution, the first metal supporting wire 32 and the second metal supporting wire 34 are generally cylindrical. The metal supporting wires have smooth surfaces. In order to prevent such a phenomenon that the metal supporting wires rotate or are not firmly after being crimped to be fixed, the inventor also sets antiskid sections 4 on the first metal supporting wire 32 and the second metal supporting wire 34. The antiskid sections 4 increase friction between the metal supporting wires and walls of the wire guide holes by means of forming concave-convex surfaces, so that the metal supporting wires may not rotate after being crimped with the wire guide holes, thus further fixing the metal supporting wires and improving the stability of a stem.

In one embodiment, a bottom end of the plastic seat 31 is provided with a first wire slot 5 and a second wire slot 6. The first wire slot 5 is used for placing the first metal supporting wire 32, and the second wire slot 6 is used for placing the second metal supporting wire 34. One end of the first metal supporting wire 32 and one end of the second metal supporting wire 34 are electrically connected to the lamp base 1 through the plastic seat 31. The first wire slot 5 and the second wire slot 6 can facilitate limiting the positions of the metal supporting wires, prevent a disorder of the position of the metal supporting wires, and facilitate subsequent assembling of the lamp base 1 and the shell 2.

Preferably, four to eight protrusions 7 are also arranged on an outer side of the plastic seat 31. By the use of the protrusions 7, the space between the shell 2 and the plastic seat 31 can be reduced, so that the plastic seat 31 is prevented from shaking.

Preferably, a bottom end of the plastic seat 31 is provided with a flange 8 cooperating with the opening portion of the shell 2. The flange 8 is used for covering the opening portion of the shell 2 to improve the sealing property of the lamp bulb and improve the waterproof performance.

In this technical solution, the plastic seat 31 is made of a PP or PE material. Compared with a poly carbonate (PC) material, the plastic seats 31 made of the PP and PE materials are easier to deform and have lower elasticity. When the first metal supporting wire 32 and the second metal supporting wire 34 are fixed by being crimped with the wire guide holes, recesses formed at crimped positions will not recover. The fixing effect on the first metal supporting wire 32 and the second metal supporting wire 34 is better, so that the quality of the lamp bulb can be guaranteed, and the yield of the lamp bulb is increased.

The above contents are only preferred embodiments of the present disclosure. Those of ordinary skill in the art can make changes to the specific implementations and application scopes according to the idea of the present disclosure, and the contents of this specification shall not be understood as restrictions to the present disclosure.

What is claimed is:

1. A light-emitting diode (LED) lamp bulb with crimped fixed wires, comprising a lamp base (1) and a shell (2) connected to the lamp base (1), and further comprising a stem assembly (3), wherein the stem assembly (3) comprises a plastic seat (31), and a first metal supporting wire (32), an LED bar (33) and a second metal supporting wire (34) which are electrically connected with each other in sequence; the plastic seat (31) is connected to an opening portion of the shell (2); one end of the plastic seat (31) is provided with a cavity (311) having an opening, and the other end is provided with a raised tongue portion (312); the raised tongue portion (312) is at least provided with a first wire guide hole (313) and a second wire guide hole (314); the first wire guide hole (313) and the second wire guide hole (314) are both communicated with the cavity (311); one end of the first metal supporting wire (32) is electrically connected to the LED bar (33) through the first wire guide hole (313); one end of the second metal supporting wire (34) is electrically connected to the LED bar (33) through the second wire guide hole (314); the other ends of the first metal supporting wire (32) and the second metal supporting wire (34) are both electrically connected to the lamp base (1);

the first metal supporting wire (32) is fixed by means of being crimped with an outer side of the first wire guide hole (313), and/or the second metal supporting wire (34) is fixed by means of being crimped with an outer side of the second wire guide hole (314);

the raised tongue portion (312) is provided with a first side surface (315) and a second side surface (316); and the first side surface (315) and the second side surface (316) are both provided with fixing regions (317); the first metal supporting wire (32) is fixed by means of being crimped with the fixing region (317) of the first side surface (315) and/or the second side surface (316) to narrow the first wire guide hole to clamp the first metal supporting wire (32);

wherein each of the first metal supporting wire (32) and the second metal supporting wire (34) comprises an antiskid section (4) with concave-convex surfaces configured to increase friction between the first and second metal supporting wires and walls of the first and second wire guide holes, respectively.

2. The LED lamp bulb with crimped fixed wires according to claim 1, wherein the first metal supporting wire (32) is fixed by means of being crimped with an upper end position, a middle position or a lower end position of the fixing region (317) of the first side surface (315).

3. The LED lamp bulb with crimped fixed wires according to claim 1, wherein the first metal supporting wire (32) is fixed by means of being crimped with at least one site (318) of the fixing region (317) of the first side surface (315).

4. The LED lamp bulb with crimped fixed wires according to claim 1, wherein a bottom end of the plastic seat (31) is provided with a first wire slot (5) and a second wire slot (6); the first wire slot (5) is used for placing the first metal supporting wire (32); and the second wire slot (6) is used for placing the second metal supporting wire (34).

5. The LED lamp bulb with crimped fixed wires according to claim 1, wherein four to eight protrusions (7) are also arranged on an outer side of the plastic seat (31).

6. The LED lamp bulb with crimped fixed wires according to claim 1, wherein a bottom end of the plastic seat (31) is provided with a flange (8) cooperating with the opening portion of the shell (2).

7. The LED lamp bulb with crimped fixed wires according to claim 1, wherein the plastic seat (31) is made of a polypropylene (PP) or polyethylene (PE) material.

* * * * *